US012084566B2

(12) United States Patent
Tran et al.

(10) Patent No.: US 12,084,566 B2
(45) Date of Patent: Sep. 10, 2024

(54) MIXED-PLASTICS-POLYPROPYLENE BLEND

(71) Applicant: Borealis AG, Vienna (AT)

(72) Inventors: Tuan Anh Tran, Linz (AT); Susana Lopes Filipe, Linz (AT); Andreas Nagl, Linz (AT); Doris Machl, Linz (AT); Andreas Rössler-Czermak, Linz (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 18/283,128

(22) PCT Filed: Mar. 25, 2022

(86) PCT No.: PCT/EP2022/057953
§ 371 (c)(1),
(2) Date: Sep. 20, 2023

(87) PCT Pub. No.: WO2022/200588
PCT Pub. Date: Sep. 29, 2022

(65) Prior Publication Data
US 2024/0093012 A1    Mar. 21, 2024

(30) Foreign Application Priority Data

Mar. 26, 2021   (EP) ..................................... 21165397
Aug. 4, 2021    (EP) ..................................... 21189650

(51) Int. Cl.
*C08L 23/12*      (2006.01)
*B29B 9/06*       (2006.01)
(Continued)

(52) U.S. Cl.
CPC ................. *C08L 23/12* (2013.01); *B29B 9/06* (2013.01); *B29B 2017/0224* (2013.01); *B29B 17/0404* (2013.01); *B29K 2023/12* (2013.01); *B29K 2025/06* (2013.01); *B29K 2077/00* (2013.01); *B29K 2995/0012* (2013.01);
(Continued)

(58) Field of Classification Search
CPC .. C08L 2207/02; C08L 2207/20; C08L 23/12; C08L 23/14; C08L 23/10; C08L 23/142
See application file for complete search history.

(56) References Cited

U.S. PATENT DOCUMENTS

| 5,767,230 A | 6/1998 | Scarola et al. |
| 2017/0002109 A1 | 1/2017 | Layman et al. |
(Continued)

FOREIGN PATENT DOCUMENTS

| CN | 105849177 A | 8/2016 |
| EP | 3502177 A1 | 6/2019 |
(Continued)

OTHER PUBLICATIONS

International Search Report and Written Opinion for PCT/EP2022/057963 mailed Jan. 1, 2023 14 pages.
(Continued)

*Primary Examiner* — Mark S Kaucher
(74) *Attorney, Agent, or Firm* — Lowenstein Sandler LLP

(57) ABSTRACT

Mixed-plastics polypropylene blend including mainly polypropylene being benzene free with defined CIELAB color.

13 Claims, 1 Drawing Sheet

(51) Int. Cl.
  *B29B 17/02* (2006.01)
  *B29B 17/04* (2006.01)
  *B29K 23/00* (2006.01)
  *B29K 25/00* (2006.01)
  *B29K 77/00* (2006.01)

(52) U.S. Cl.
  CPC ............. *B29K 2995/0063* (2013.01); *B29K 2995/0077* (2013.01); *B29K 2995/0078* (2013.01); *C08L 2203/16* (2013.01); *C08L 2207/02* (2013.01); *C08L 2207/20* (2013.01)

(56) References Cited

U.S. PATENT DOCUMENTS

| | | |
|---|---|---|
| 2017/0152376 A1 | 6/2017 | Liu et al. |
| 2021/0403694 A1* | 12/2021 | Burmaster ............. C08L 23/16 |
| 2024/0093012 A1 | 3/2024 | Tran et al. |

FOREIGN PATENT DOCUMENTS

| | | |
|---|---|---|
| EP | 4194502 A1 | 6/2023 |
| JP | 2018521186 A | 8/2018 |
| JP | 2024512031 A | 3/2024 |
| KR | 1020200024245 A | 3/2020 |
| KR | 1020200083628 A | 7/2020 |
| WO | 2018046578 A1 | 3/2018 |
| WO | 2020064673 A1 | 4/2020 |
| WO | 2020089037 A1 | 5/2020 |
| WO | 21032459 A1 | 2/2021 |

OTHER PUBLICATIONS

International Preliminary Report on Patentability for PCT/EP2022/057963 dated Jan. 16, 2023, 14 pages.
Demets, Ruben, et al. "Development and application of an analytical method to quantify odour removal in plastic waste recycling processes." Resources, Conservation and Recycling 161 (2020).
Jeremic et al. "Rapid characterization of high-impact ethylene-propylene copolymer composition by crystallization extraction separation: comparability to standard separation methods", International Journal of Polymer Analysis and Characterization, 25:8, 581-596, 2020.
Zhou, et al., "A new decoupling method for accurate quantification of polyethylene copolymer composition and triad sequence distribution with 13C NMR," Journal of Magnetic Resonance, vol. 187, 2007, pp. 225-233.
Cheng, H.N., "C NMR Analysis of Ethylene-Propylene Rubbers," Macromolecules, 1984, vol. 17, 1984, pp. 1950-1955.
Definition of terms relating to the non-ultimate mechanical properties of polymers, Pure & Appl. Chem. vol. 70, No. 3, pp. 701-754, 1998.
Heino, et al., "The Influence of Molecular Structure on Some Rheological Properties of Polyethylene", Annual Transactions of the Nordic Rheology Society, 1995, pp. 71-73.
Heino et al., "Rheological Characterization of Polyethylene Fractions", Theoretical and Applied Rheology, Proc. XIth Int. Congr. on Rheology, Brussels, Belgium, Aug. 17-21, 1992, pp. 360-362.
Wang, et al., "Structural Analysis of Ethylene/Propylene Copolymers Synthesized with a Constrained Geometry Catalyst," Macromolecules, 2000, vol. 33, pp. 1157-1162.
J.M. Dealy, K. F. Wissbrun, Melt Rheology and Its Role in Plastics Processing: Theory and Applications; edited by Van Nostrand Reinhold, New York (1990).
S. Filipe, Non-Linear Rheology of Polymer Melts, AIP Conference 30 Proceedings 1152, pp. 168-174 (2009).
M. Wilhelm, "Fourier-TGransform Rheology", Macromolecular Matteral Eng. 287, 23 pages (2002).
S. Filipe, K. Hofstadler, K. Klimke, A. T. Tran, Non-Linear Rheological Parameters for Characterisation of Molecular Structural Properties in Polyolefins, Proceedings of Annual European Rheology Conference, 135 (2010).
Busico, et al., "Alk-1-ene Polymerization in the Presence of a Monocyclopentadienyl Zirconium (iv) Acetamidinate Catalyst: Microstructural and Mechanistic Insights a," Macromolecular Rapid Commun., vol. 28, 2007, pp. 1128-1134.
Singh, et al., "Triad Sequence Determination of Ethylene-Propylene Copolymers—Application of Quantitative 13C NMR," Polymer Testing, 2009, vol. 29, pp. 475-479.
S. Filipe, K. Klimke, A. T. Tran, J. Reussner, Proceedings of Novel Non-Linear Rheological Parameters for Molecular Structural Characterisation of Polyolefins, Novel Trends in Rheology IV, Zlin, Check Republik (2011).
K. Klimke, "Non-linear rheological parameters for characterization of molecular structural properties in polyolefins", Proceedings of European Polymer Conference, Granada, Spain (2011).
Ortin, A. et al., "Development of an Automated Cross-Fractionation Apparatus (TREF-GPC)for a Full Characterization of the Biuvariate Distribution of Polyolefins", Macromol. Symp. 2007, 257, pp. 13-28.
European Search Report for EP21189650.1 dated Dec. 14, 2021, 6 pages.
Office Action for Taiwanese Patent Application No. 111111511 dated Jan. 9, 2023, 18 pages.
Notice of Allowance for Korean Patent Application No. 10-2023-7036484 dated Dec. 22, 2023, 4 pages.
JP Office Action for Application No. 2023-557808 dated Mar. 12, 2024, 2 pgs.
CN Office Action for Application No. 202280023137.1 dated Feb. 27, 2024, 12 pgs.
Office Action for Japanese Patent Application Serial No. 2023-557808 dated Jul. 9, 2024, in Japanese and English, 6 pages.

* cited by examiner

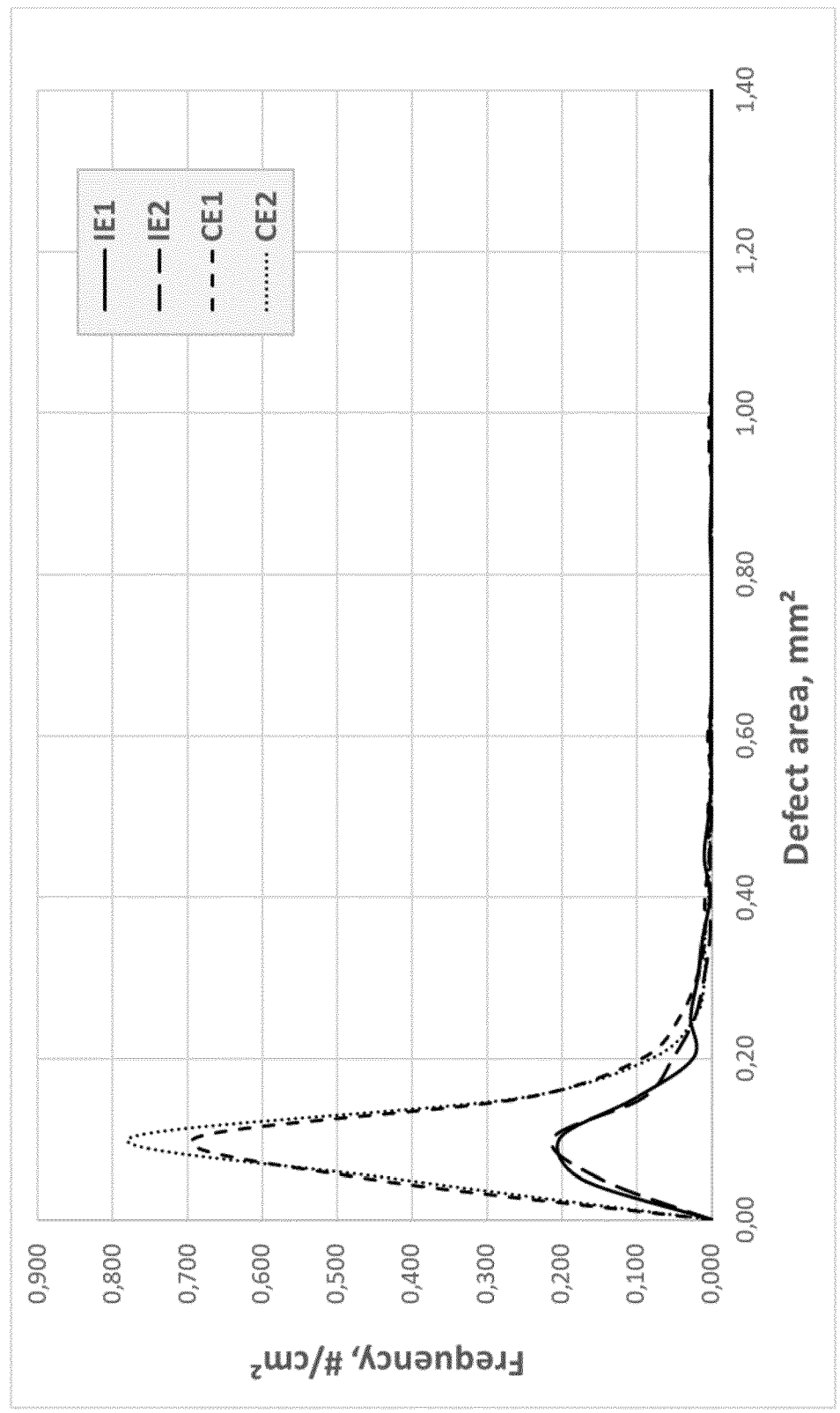

MIXED-PLASTICS-POLYPROPYLENE BLEND

CROSS-REFERENCE TO RELATED APPLICATION(S)

The present application is a national stage entry under 35 U.S.C. § 371 of International Application No. PCT/EP2022/057953, filed on Mar. 25, 2022, which claims priority to European Patent Application No. 21165397.7, filed on Mar. 26, 2021 and European Patent Application No. 21189650.1, filed on Aug. 4, 2021. The contents of these applications are hereby incorporated by reference in their entirety,

FIELD OF THE INVENTION

The present invention relates to mixed-plastics polypropylene blends as typically originating from recyclates.

BACKGROUND

Many attempts have been made for purifying recycling streams as originating from post-consumer trash. Among those measures washing, sieving, aeration, distillation and the like may be mentioned. For example, WO2018046578 discloses a process for the production of polyolefin recyclates from mixed color polyolefin waste including packaging waste comprising cold washing the waste with water followed by washing with an alkali medium at 60° C., followed by flake color sorting to receive color sorted (white, transparent, other colors) mono polyolefin rich fractions. Those fractions are then treated at 50-155° C. U.S. Pat. No. 5,767,230A describes a process comprising contacting PCR polyolefin chips containing volatile impurities with a heated gas at a superficial velocity sufficient to substantially reduce the volatile impurities such as odor active substances. However, up to now contamination by residual amounts of benzene turned out to be a problem. The origin of residual amounts of benzene in post-consumer recyclates is still dubious but constitutes a hurdle for end-uses in fields such as medical packaging, food packaging and the like. Residual amounts, i.e. traces of benzene constitutes a particularly problem as odor tests by sniffing experiments become impossible. Thus, end-uses having certain demands as to odor are blocked. Color is still a remaining problem not completely addressed. Many re-use applications require material being close to what is usually denoted white color. As yet a further problem known recyclates suffer from moderate homogeneity as reflected by surface contamination occurring in injection molded products. A specific demand exists for recyclates suitable for injection molding for dosing caps, toileteries, screw caps, caps and closures.

Thus, the problem of providing a more valuable polypropylene blend remains.

SUMMARY OF THE INVENTION

The present invention provides a mixed-plastics polypropylene blend having
(i) a crystalline fraction (CF) content determined according to CRYSTEX QC analysis in the range from 86.0 to 94.0 wt.-%, and
(ii) a soluble fraction (SF) content determined according to CRYSTEX QC analysis in the range from 6.0 to 14.0 wt.-%, whereby
(iii) said crystalline fraction (CF) has a propylene content (C3(CF)) as determined by FT-IR spectroscopy calibrated by quantitative $^{13}$C-NMR spectroscopy, in the range from 95.0 to 99.0 wt.-%; preferably 96.0 to 98.0 wt.-% and whereby
(iv) said crystalline fraction (CF) has an ethylene content (C2(CF)), as determined by FT-IR spectroscopy calibrated by quantitative $^{13}$C-NMR spectroscopy, in the range from 1.0 to 5.0 wt.-% preferably 2.0 to 4.0 wt.-% and more preferably 2.5 to 3.5 wt.-%; and
(v) said soluble fraction (SF) has an intrinsic viscosity (iV(SF)) in the range from 1.10 to below 1.50 dl/g, preferably 1.25 to 1.45 dl/g; and
whereby
(vi) the mixed-plastics polypropylene blend has inorganic residues as measured by calcination analysis (TGA) according to DIN ISO 1172:1996 of 0.05 to 3.0 wt.-%, preferably 0.05 to 2.5 wt.-%, optionally 1.0 to 2.5 wt.-% with respect to the mixed-plastics polypropylene blend; and
whereby
(vii) the mixed-plastics polypropylene blend does not contain benzene above the detection limit of HS GC-MS 80° C./2h; and
whereby
(viii) the mixed-plastics polypropylene blend has a CIELAB color space (L*a*b*) of
L* from 72.0 to 97.0, preferably from 80.0 to 97.0;
a* from −5.0 to 0.0;
b* from 0.0 to below 22.0; and
whereby
(ix) the mixed-plastics polypropylene blend has a Large Amplitude Oscillatory Shear-Non-Linear Factor [LAOS-NLF] (190° C., 1000%) higher than 2.3, whereby $$LAOS-NLF = \left|\frac{G'_1}{G'_3}\right|$$

whereby
$G_1'$ is the first order Fourier Coefficient
$G_3'$ is the third order Fourier Coefficient.

The present invention is also concerned with the mixed-plastics polypropylene blend in pellet form and mixed-plastics polypropylene blend being visbroken by peroxides. The present invention further provides articles made from the mixed-plastics polypropylene blend and a use for packaging and/or in the medical field. In yet a further aspect, the present invention concerns blends of the mixed-plastics polypropylene blend with at least one virgin polyolefin.

Mixed plastics is defined as the presence of low amounts of compounds usually not found in virgin polypropylene blends such as polystyrenes, polyamides, polyesters, wood, paper, limonene, aldehydes, ketones, fatty acids, metals, and/or long term decomposition products of stabilizers. Virgin polypropylene blends denote blends as directly originating from the production process without intermediate use.

As a matter of definition, "mixed plastics" can be equated with detectable amounts of polystyrene and/or polyamide-6 and/or limonene and/or fatty acids.

The mixed-plastics polypropylene blend further has a broadened molecular weight distribution because it is a mechanical blend of countless polypropylenes and some very minor amount of low density polyethylene as well as linear low density polyethylenes. It will be understood by those skilled in the art that polypropylenes from various manufactures end up in plastic trash streams particularly when presorted in polyolefin-rich plastic trash streams.

It further will be understood by those skilled in the art that a soluble fraction (SF) as obtained by CRYSTEX QC analysis having an intrinsic viscosity (iV(SF)) in the range from 1.10 to below 1.50 dl/g is typically found in material from recycling streams. In a preferred aspect of the invention the soluble fraction (SF) as obtained by CRYSTEX QC analysis has an intrinsic viscosity (iV(SF)) in the range from 1.25 to below 1.45 dl/g.

It has been surprisingly found that the mixed-plastics polypropylene blend according to the present invention provides better surface properties enabling numerous demanding end-use applications.

In a first embodiment, it is preferred that the amounts of the crystalline fraction (CF) and soluble fraction (SF) in CRYSTEX QC analysis are:
  87.0 to 90.0 wt.-% crystalline fraction (CF) content and
  10.0 to 13.0 wt.-%, soluble fraction (SF) content.

In a second embodiment the amounts of the crystalline fraction (CF) and soluble fraction (SF) in CRYSTEX QC analysis are:
  91.0 to 94.0 wt.-% crystalline fraction (CF) content and
  6.0 to 9.0 wt.-%, soluble fraction (SF) content.

In the first embodiment the mixed-plastics polypropylene blend has a CIELAB color space (L*a*b*) of
  L* from 85.0 to 97.0;
  a* from −5.0 to 0.0;
  b* from 0.0 to below 8.0.

In the second embodiment the mixed-plastics polypropylene blend has a CIELAB color space (L*a*b*) of
  L* from 72.0 to 97.0, preferably from 80.0 to 97.0;
  a* from −5.0 to 0.0;
  b* from 0.0 to below 22.0, usually from above 8.0 to below 22.0

The CIELAB color can be influenced by the sorting process. The more yellowish material is accepted, the higher b*.

The mixed-plastics polypropylene blend according to the present invention typically has a melt flow rate (ISO1133, 2.16 kg; 230° C.) of 2.0 to 100 g/10 min. The melt flow rate can be influenced by splitting post-consumer plastic waste streams, for example, but not limited to: originating from extended producer's responsibility schemes, like from the German DSD, or sorted out of municipal solid waste into a high number of pre-sorted fractions and recombine them in an adequate way. As a further way of modifying melt flow rate of the final mixed-plastics polypropylene blend peroxides can be introduced in the final pelletization step. Usually MFR ranges from 2.0 to 100 g/10 min, preferably from 5.0 to 80 g/10 min, more preferably from 10 to 60 g/10 min. and most preferably from 12 to 55 g/10 min.

The MFR of the second embodiment preferably ranges from 2.0 to 12 g/10 min (ISO1133, 2.16 kg; 230° C.). This MFR range particularly holds for the non-visbroken mixed-plastics polypropylene blend. Visbreaking allows increase of MFR to 30 g/10 min also for the second embodiment.

Usually the mixed-plastics polypropylene blend according to the present invention will be a recycled material.

Typically, the recycling nature can be assessed by the presence of one or more of the following substances:
  a) polystyrene
  b) polyamide-6
  c) limonene as determined by using solid phase microextraction (HS-SPME-GC-MS)
  d) fatty acids as determined by using solid phase microextraction (HS-SPME-GC-MS).

Presence means detectable limits. The detection limit for limonene and fatty acids in solid phase microextraction (HS-SPME-GC-MS) is below 0.1 ppm, i.e. traces of these substances easily allow figuring out recycling nature.

The following amounts are preferred
  a) polystyrene: 0 to 2.0 wt.-%; more preferred 0 to 0.5 wt.-%
  b) polyamide-6: 0 to 1.5 wt.-%; more preferred 0 to 0.5 wt.-%
  c) limonene as determined by using solid phase microextraction (HS-SPME-GC-MS): 0.1 ppm to 50 ppm
  d) fatty acids as determined by using solid phase microextraction (HS-SPME-GC-MS): 0.1 ppm to 200 ppm, more preferably 50 ppm.

It goes without saying that the amounts of a), b), c) and d) should be as low as possible. In a specifically preferred embodiment, the mixed-plastics polypropylene blend is free of polystyrene and is free of polyamide meaning both polymers are below the detection limit.

The mixed-plastics polypropylene blend according to the present invention preferably has a soluble fraction (SF) obtained by CRYSTEX QC analysis with a content of ethylene (C2(SF)), as determined by FT-IR spectroscopy calibrated by quantitative $^{13}$C-NMR spectroscopy, in the range from 12.0 to 32.0 wt.-%.

In the first embodiment, the mixed-plastics polypropylene blend according to the present invention preferably has a soluble fraction (SF) obtained by CRYSTEX QC analysis with a content of ethylene (C2(SF)), as determined by FT-IR spectroscopy calibrated by quantitative $^{13}$C-NMR spectroscopy, in the range from 25.0 to 32.0 wt.-%.

In the second embodiment, the mixed-plastics polypropylene blend according to the present invention preferably has a soluble fraction (SF) obtained by CRYSTEX QC analysis with a content of ethylene (C2(SF)), as determined by FT-IR spectroscopy calibrated by quantitative $^{13}$C-NMR spectroscopy, in the range from 10.0 to 25.0 wt.-%, more preferably 12.0 to 25.0 wt.-%, even more preferably 12.0 to 20.0 wt.-% and most preferably 14.0 to 19.0 wt.-%.

The mixed-plastics polypropylene blend according to the present invention is preferably characterized by an odor (VDA270-B3) of 4.0 or lower, preferably 3.0 or lower. It should be understood that many commercial recycling grades which do not report odor are in fact even worse as an odor test under VDA270 is forbidden due to the presence of problematic substances.

In a further aspect the mixed-plastics polypropylene blend according to present invention, particularly of the first embodiment, has a Large Amplitude Oscillatory Shear-Non-Linear Factor (LAOS-NLF) (190° C.; 1000%) preferably higher than 2.7, more preferably higher than 3.3, whereby $$LAOS-NLF = \left|\frac{G'_1}{G'_3}\right|$$

whereby
  $G_1'$ is the first order Fourier Coefficient
  $G_3'$ is the third order Fourier Coefficient In the second embodiment, the Large Amplitude Oscillatory Shear-Non-Linear Factor (LAOS-NLF) (190° C.; 1000%) is merely higher than 2.3.

Without wishing to being bound by theory, it is believed that the processing of the polymer contributes to branching triggered by enclosed contaminants. The LAOS-NLF may be influenced by selecting feedstock such that about 10 wt.-% of the material is soft polypropylene. In this respect, "soft polypropylene" means a tensile modulus (measured as described in the experimental part) of below 900 MPa. The incorporation of low density polyethylenes and linear low density polyethylenes, more precisely the presence of low crystalline PE Fraction (LCF-PE) as observed in CFC analysis in an amount of 2.0 to 4.0 wt.-% also contributes to the Large Amplitude Oscillatory Shear-Non-Linear Factor (LAOS-NLF) (190° C.; 1000%) of higher than 2.3. It should be understood that several regions operate collection stations collecting highly consumer pre-sorted plastics. Such highly valuable plastics streams are commercially available and allow upgrading of other low quality streams (such as by a softer polypropylene mixture) from other waste disposal resources. The second embodiment having higher amount of crystalline fraction (CF), i.e. 91.0 to 94.0 wt.-% crystalline fraction (CF) content and 6.0 to 9.0 wt.-%, soluble fraction (SF) content, is more limited, whereby the Large Amplitude Oscillatory Shear-Non-Linear Factor (LAOS-NLF) (190° C.; 1000%) is somewhat lower.

In yet a further aspect, the mixed-plastics polypropylene blend according to the first embodiment of the present invention has a tensile modulus (ISO 527-2 at a cross head speed of 1 mm/min; 23° C.) using injection molded specimens as described in EN ISO 1873-2 (dog bone shape, 4 mm thickness) of at least 1300 MPa, preferably at least 1350 MPa, most preferably at least 1390 MPa. Such relatively high tensile modulus results from the relatively low amounts of rubber like and plastomer like materials. Usually the tensile modulus (ISO 527-2 at a cross head speed of 1 mm/min; 23° C.) of the first embodiment will not be higher than 1500 MPa.

The mixed-plastics polypropylene blend according to the second embodiment of the present invention has a tensile modulus (ISO 527-2 at a cross head speed of 1 mm/min; 23° C.) using injection molded specimens as described in EN ISO 1873-2 (dog bone shape, 4 mm thickness) of at least 1200 MPa, preferably at least 1250 MPa. Usually the tensile modulus (ISO 527-2 at a cross head speed of 1 mm/min; 23° C.) of the second embodiment will not be higher than 1400 MPa.

The mixed-plastics polypropylene blend according to the first embodiment of the present invention surprisingly results in exceptional time stability as to melt flow rate, eta (2.7 kPa) and eta (300 rad/s) As yet a further and surprising advantage an exceptionally high melt strength was observed. Further surprisingly it turned out there is exceptionally good homogeneity of the mixed-plastics polypropylene blend according to the present invention. For example, different (selected) pellets of one batch showed essentially the same values of melt flow rate, eta (2.7 kPa) and eta (300 rad/s) when analyzed separately. This is an exceptional finding since substantial variation is expected with recycled materials.

The mixed-plastics polypropylene blend according to the second embodiment turned out to have excellent processability reflected by a shear thinning factor (STF) being the ratio of eta 0.05 and eta 300 of above 13.0.

Charpy notched impact strength (non-instrumented, ISO 179-1 at +23° C.) of the mixed-plastics polypropylene blend according to the present invention is preferably higher than 4.0 kJ/m$^2$, more preferably higher than 4.5 kJ/m$^2$. The Charpy notched impact strength (non-instrumented, ISO 179-1 at +23° C.) of the mixed-plastics polypropylene blend according to the second embodiment is preferably higher than 6.0 kJ/m$^2$, more preferably higher than 8.0 kJ/m$^2$, most preferably higher than 8.3 kJ/m$^2$.

In specifically preferred embodiment, the mixed-plastics polypropylene blend according to present invention has a notched Charpy impact strength (NIS) (1eA) (non-instrumented, ISO 179-1 at +23° C.) according to ISO 179-1 eA at +23° C. on injection moulded specimens of 80×10×4 mm prepared according to EN ISO 1873-2 of at least 8.0 kJ/m$^2$, preferably 8.3 kJ/m$^2$, whereby further said soluble fraction (SF) obtained by CRYSTEX QC analysis has an ethylene content (C2(SF)), as determined by FT-IR spectroscopy calibrated by quantitative $^{13}$C-NMR spectroscopy, in the range from 12.0 to 20.0 wt.-% and further preferably the mixed-plastics polypropylene blend has a CIELAB color space (L*a*b) of L* from 72.0 to 97.0, preferably from 80.0 to 97.0;
a* from −5.0 to 0.0;
b* from 0.0 to below 22.0

In this specifically preferred aspect of the second embodiment, the crystalline fraction (CF) content determined according to CRYSTEX QC analysis is preferably in the range from 91.0 to 94.0 wt.-% and the soluble fraction (SF) content determined according to CRYSTEX QC analysis is preferably in the range of 6.0 to 9.0 wt.-%.

The mixed-plastics polypropylene blend according to the present invention, i.e. first and second embodiment, is preferably present in the form of pellets. Pelletization contributes to the low amounts of volatile substances.

In an embodiment, the mixed-plastics polypropylene blend according to the present invention is visbroken by one or more peroxides. The mixed-plastics polypropylene blend can be subjected to visbreaking as any other virginpolyproylene blend. If the mixed-plastics polypropylene blend according to the present invention has been subjected to visbreaking, the decomposition products of the visbreaking process can be found in the resulting blend. It should be understood that decomposition products of visbreaking process (as commonly used in the art for virgin materials) are not considered as impurities. Visbreaking can be done with the first and the second embodiment.

In a further aspect, the present invention concerns a molded article made from the mixed-plastics polypropylene blend as described herein. This applies to the first and the second embodiment.

In yet a further aspect, the present invention concerns blends containing the mixed-plastics polypropylene blend as described herein and at least one virgin polyolefin. Again, this applies for the first and second embodiment. For example, virgin polypropylene homopolymer as contained in heterophasic polypropylenes can be substituted by the mixed-plastics polypropylene blend as described herein.

The present invention also pertains to the use of the mixed-plastics polypropylene blend according to present invention, i.e. the first and the second embodiment, for packaging and/or in the medical field.

DETAILED DESCRIPTION

The process for providing the mixed-plastics polypropylene blend according to the present invention is pretty demanding. The process comprises the following steps:
a) providing post-consumer plastic trash;
b) sorting out goods made from polystyrene, polyamide, polyethylene, metals, paper, wood and other non-polyproplyene materials thereby providing a post-consumer plastic material;
c) sorting out colored goods thereby providing a post-consumer plastic material containing mainly white bottles, mainly white yoghurt cups, mainly white cans, mainly colorless panels, mainly colorless component parts and the like;

d) subjecting the selected post-consumer plastic material having mainly white color or being colorless to milling, washing in an aqueous solution with various detergents and subsequent drying, wind sifting and screening;

e) subjecting the pretreated post-consumer plastic material to a further sorting for eliminating non-polyolefin and colored parts yielding an intermediate;

f) quality control step, wherein the intermediate from step e) is subjected to Cross Fractionation Chromatography and whereby determining the low-crystalline-polyethylene fraction (LCF-PE) in CFC and double-checking whether said amount falls into the range of 2.0 to 4.0 wt.-%;

g) discarding intermediate not having a low-crystalline-polyethylene fraction in the range of 2.8 to 4.2 wt.-%;

h) extruding the material and yielding the polypropylene blend according to the present invention in the form of pellets;

i) optional aeration which is preferably carried out at a temperature in a range of 100-130° C. by preheating the post-consumer plastic material to such temperature using an air stream having a temperature of at least 100° C.

Several possible feedstocks from both separate collection systems (e.g. from extended producer responsibility schemes) as well as particularly municipal trash collection systems are commercially available and allow providing post-consumer plastic trash. Depending on the participation of the consumer and the quality of the sorting plants involved, the purity of those feedstocks will differ which is usually indicated by the collecting systems. It is further possible to screen the intermediate after step b) for the presence of apparently very old ('ancient') mainly colorless/natural plastic articles. Discoloration (e.g. pronounced yellowing) and/or pronounced scratches of the mainly colorless/natural plastic articles allow the sorting. Such step makes it possible to get rid of so-called substances of very high concern. Those substances such as Pb, Hg, polybrominated diphenyl ethers, and the like have been banned for quite some time but are still present in the real world as consumers tend to stockpile plastic articles e.g. in the form of plastic toys for many years and eventually throw them away into collection systems. The additional screen step can be assisted by analysis controls for said substances of very high concern.

Odor control and assessment is possible by a number of methods. An overview is provided inter alia by Demets, Ruben, et al. "Development and application of an analytical method to quantify odour removal in plastic waste recycling processes." *Resources, Conservation and Recycling* 161 (2020): 104907 being incorporated by reference herewith.

EXPERIMENTAL

The following Examples are included to demonstrate certain aspects and embodiments of the invention as described in the claims. It should be appreciated by those of skill in the art, however, that the following description is illustrative only and should not be taken in any way as a restriction of the invention.

Test Methods a) Crystex

Determination of Crystalline and soluble fractions and their respective properties (IV and Ethylene Content)

The crystalline (CF) and soluble fractions (SF) of the polypropylene (PP) compositions as well as the comonomer content and intrinsic viscosities of the respective fractions were analyzed by use of the CRYSTEX instrument, Polymer Char (Valencia, Spain). Details of the technique and the method can be found in literature (Ljiljana Jeremic, Andreas Albrecht, Martina Sandholzer & Markus Gahleitner (2020) Rapid characterization of high-impact ethylene-propylene copolymer composition by crystallization extraction separation: comparability to standard separation methods, International Journal of Polymer Analysis and Characterization, 25:8, 581-596)

The crystalline and amorphous fractions are separated through temperature cycles of dissolution at 160° C., crystallization at 40° C. and re-dissolution in 1,2,4-trichlorobenzene at 160° C. Quantification of SF and CF and determination of ethylene content (C2) are achieved by means of an integrated infrared detector (IR4) and for the determination of the intrinsic viscosity (IV) an online 2-capillary viscometer is used.

The IR4 detector is a multiple wavelength detector measuring IR absorbance at two different bands (CH3 stretching vibration (centred at app. 2960 cm$^{-1}$) and the CH stretching vibration (2700-3000 cm$^{-1}$) that are serving for the determination of the concentration and the Ethylene content in Ethylene-Propylene copolymers. The IR4 detector is calibrated with series of 8 EP copolymers with known Ethylene content in the range of 2 wt.-% to 69 wt.-% (determined by 13C-NMR) and each at various concentrations, in the range of 2 and 13 mg/ml. To encounter for both features, concentration and ethylene content at the same time for various polymer concentrations expected during Crystex analyses the following calibration equations were applied:

$$\text{Conc}=a+b*\text{Abs(CH)}+c*(\text{Abs(CH)})^2+d*\text{Abs(CH}_3)+e*(\text{Abs(CH}_3))^2+f*\text{Abs(CH)}*\text{Abs(CH}_3) \quad \text{(Equation 1)}$$

$$CH_3/1000C=a+b*\text{Abs(CH)}+c*\text{Abs(CH}_3)+d*(\text{Abs(CH}_3)/\text{Abs(CH)})+e*(\text{Abs(CH}_3)/\text{Abs(CH)})^2 \quad \text{(Equation 2)}$$

The constants a to e for equation 1 and a to f for equation 2 were determined by using least square regression analysis.

The $CH_3/1000$ C is converted to the ethylene content in wt.-% using following relationship:

$$Wt.\text{-\% (Ethylene in } EP \text{ Copolymers)}=100-CH_3/1000TC*0.3 \quad \text{(Equation 3)}$$

Amounts of Soluble Fraction (SF) and Crystalline Fraction (CF) are correlated through the XS calibration to the "Xylene Cold Soluble" (XCS) quantity and respectively Xylene Cold Insoluble (XCI) fractions, determined according to standard gravimetric method as per ISO16152. XS calibration is achieved by testing various EP copolymers with XS content in the range 2-31 Wt %. The determined XS calibration is linear:

$$Wt.\text{-\% } XS=1,01*Wt.\text{-\% } SF \quad \text{(Equation 4)}$$

Intrinsic viscosity (IV) of the parent EP copolymer and its soluble and crystalline fractions are determined with a use of an online 2-capillary viscometer and are correlated to corresponding IV's determined by standard method in decalin according to ISO 1628-3. Calibration is achieved with various EP PP copolymers with IV=2-4 dL/g. The determined calibration curve is linear:

$$IV(dL/g)=a*Vsp/c \quad \text{(equation 5)}$$

The samples to be analyzed are weighed out in concentrations of 10 mg/ml to 20 mg/ml. To avoid injecting possible gels and/or polymers, which do not dissolve in TCB at 160° C., like PET and PA, the weighed out sample was packed into a stainless steel mesh MW 0.077/D 0.05 mmm.

After automated filling of the vial with 1,2,4-TCB containing 250 mg/l 2,6-tert-butyl-4-methylphenol (BHT) as antioxidant, the sample is dissolved at 160° C. until complete dissolution is achieved, usually for 60 min, with constant stirring of 400 rpm. To avoid sample degradation, the polymer solution is blanketed with the N2 atmosphere during dissolution.

A defined volume of the sample solution is injected into the column filled with inert support where the crystallization of the sample and separation of the soluble fraction from the crystalline part is taking place. This process is repeated two times. During the first injection the whole sample is measured at high temperature, determining the IV[dl/g] and the C2[wt %] of the PP composition. During the second injection, the soluble fraction (at low temperature) and the crystalline fraction (at high temperature) with the crystallization cycle are measured (Wt % SF, Wt % C2, IV).

b) Quantification of Microstructure by NMR Spectroscopy (Calibration Only)

Quantitative nuclear-magnetic resonance (NMR) spectroscopy was used for calibration.

Quantitative 13C{1H} NMR spectra were recorded in the solution-state using a Bruker Avance Neo 400 NMR spectrometer operating at 400.15 and 100.62 MHz for 1H and 13C respectively. All spectra were recorded using a 13C optimized 10 mm extended temperature probe head at 125° C. using nitrogen gas for all pneumatics. Approximately 200 mg of material was dissolved in approximately 3 ml of 1,2-tetrachloroethane-d2 (TCE-d2) along with approximately 3 mg BHT (2,6-di-tert-butyl-4-methylphenol CAS 128-37-0) and chromium-(III)-acetylacetonate (Cr(acac)3) resulting in a 60 mM solution of relaxation agent in solvent as described in G. Singh, A. Kothari, V. Gupta, Polymer Testing 2009, 28(5), 475.

To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme as described in Z. Zhou, R. Kuemmerle, X. Qiu, D. Redwine, R. Cong, A. Taha, D. Baugh, B. Winniford, J. Mag. Reson. 187 (2007) 225 and V. Busico, P. Carbonniere, R. Cipullo, C. Pellecchia, J. Severn, G. Talarico, Macromol. Rapid Commun. 2007, 28, 1128. A total of 6144 (6 k) transients were acquired per spectra.

Quantitative 13C{1H} NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present.

Characteristic signals corresponding to the incorporation of ethylene were observed (as described in Cheng, H. N., Macromolecules 1984, 17, 1950) and the comonomer fraction calculated as the fraction of ethylene in the polymer with respect to all monomer in the polymer:

$$fE=(E/(P+E)$$

The comonomer fraction was quantified using the method of W-J. Wang and S. Zhu, Macromolecules 2000, 33 1157, through integration of multiple signals across the whole spectral region in the 13C{1H} spectra. Integral regions were slightly adjusted to increase applicability across the whole range of encountered comonomer contents.

The mole percent comonomer incorporation was calculated from the mole fraction:

$$E[\text{mol \%}]=100*fE$$

The weight percent comonomer incorporation was calculated from the mole fraction:

$$E[\text{wt \%}]=100*(fE*28.06)/((fE*28.06)+((1-fE)*42.08)).$$

c) Tensile modulus and tensile strain at break were measured according to ISO 527-2 (cross head speed=1 mm/min; test speed 50 mm/min at 23° C.) using injection molded specimens as described in EN ISO 1873-2 (dog bone shape, 4 mm thickness). The measurement is done after 96 h conditioning time of the specimen.

d) Impact strength was determined as notched Charpy impact strength (1eA) (non-instrumented, ISO 179-1 at +23° C.) according to ISO 179-1 eA at +23° C. on injection moulded specimens of 80×10×4 mm prepared according to EN ISO 1873-2.

e) Inorganic residues: TGA according to DIN ISO 1172: 1996 using a Perkin Elmer TGA 8000. Approximately 10-20 mg of material was placed in a platinum pan. The temperature was equilibrated at 50° C. for 10 minutes, and afterwards raised to 950° C. under nitrogen at a heating rate of 20° C./min. The ash content was evaluated as the weight % at 850° C.

f) MFR: melt flow rates were measured with a load of 2.16 kg ($MFR_2$) at 230° C. The melt flow rate is that quantity of polymer in grams, which the test apparatus standardized to ISO 1133 extrudes within 10 minutes at a temperature of 230° C. under a load of 2.16 kg.

g) Amount of Metals
   determined by x ray fluorescence (XRF).

h) Amount of Paper, Wood (for control purposes only)
   paper and wood can be determined by conventional laboratory methods including milling, floatation, microscopy and Thermogravimetric Analysis (TGA).

i) Benzene Content
   by HS GC-MS 80° C./2 h, which is described as the following Static Headspace Analysis The parameters of the applied static headspace gas chromatography mass spectrometry (HS/GC/MS) method are described here.

4.000±0.100 g sample were weighed in a 20 ml HS vial and tightly sealed with a PTFE cap.

The mass spectrometer was operated in scan mode and a total ion chromatogram (TIC) was recorded for each analysis. More detailed information on applicable method parameters and data evaluation are given below:

HS parameter (Agilent G1888 Headspace Sampler)
Vial equilibration time: 120 min
Oven temperature: 80° C.
Loop temperature: 205° C.
Transfer line temperature: 210° C.
Low shaking
GC parameter (Agilent 7890A GC System)
Column: ZB-WAX 7HG-G007-22 (30 m×250 μm×1 μm)
Carrier gas: Helium 5.0

Flow: 2 ml/min
Split: 5:1
GC oven program: 35° C. for 0.1 min
   10° C./min until 250° C.
      250° C. for 1 min
MS parameter (Agilent 5975C inert XL MSD)
Acquisition mode: Scan
Scan parameters:
Low mass: 20
   High mass: 200
   Threshold: 10
Software/Data evaluation
MSD ChemStation E.02.02.1431
MassHunter GC/MS Acquisition B.07.05.2479
AMDIS GC/MS Analysis Version 2.71
NIST Mass Spectral Library Version 2.0 g
AMDIS deconvolution parameters
Minimum match factor: 80
Threshold: Low
Scan direction: High to Low
Data file format: Agilent files
Instrument type: Quadrupole
Component width: 20
Adjacent peak subtraction: Two
Resolution: High
Sensitivity: Very high
Shape requirements: Medium
Solvent tailing: 44 m/z
Column bleed: 207 m/z
Min. model peaks: 2
Min. S/N: 10
Min. certain peaks: 0.5
Data evaluation The TIC data were further deconvoluted with the aid of AMDIS software (see parameters stated above) and compared to a custom target library which was based on the mass spectral library (NIST). In the custom target library, the respective mass spectra of selected substances (e.g. benzene) were included. Only when the recognised peak showed a minimum match factor of 80 and an experienced mass spectroscopist confirmed the match, a substance was accepted as "tentatively identified".

In this study, the statement "below the limit of detection (<LOD)" referred to a condition where either the match factor was below 80 (AMDIS) or the peak as such was not even recognised. The results refer solely to the measured samples, time of measurement and the applied parameters.

j) CIELAB Color Space (L*a*b*)

In the CIE L*a*b* uniform color space, measured according to DIN EN ISO 11664-4, the color coordinates are: L*—the lightness coordinate; a*—the red/green coordinate, with +a* indicating red, and −a* indicating green; and b*—the yellow/blue coordinate, with +b* indicating yellow, and −b* indicating blue. The L*, a*, and b*coordinate axis define the three dimensional CIE color space. Standard Konica/Minolta Colorimeter CM-3700A.

k) Odor VDA270-B3

VDA 270 is a determination of the odor characteristics of trim-materials in motor vehicles. In this study, the odor is determined following VDA 270 (2018) variant B3. The odor of the respective sample is evaluated by each assessor according to the VDA 270 scale after lifting the jar's lid as little as possible. The hexamerous scale consists of the following grades: Grade 1: not perceptible, Grade 2: perceptible, not disturbing, Grade 3: clearly perceptible, but not disturbing, Grade 4: disturbing, Grade 5: strongly disturbing, Grade 6: not acceptable. Assessors stay calm during the assessment and are not allowed to bias each other by discussing individual results during the test. They are not allowed to adjust their assessment after testing another sample, either. For statistical reasons (and as accepted by the VDA 270) assessors are forced to use whole steps in their evaluation. Consequently, the odor grade is based on the average mean of all individual assessments, and rounded to whole numbers.

l) Limonene Detection

Limonene quantification can be carried out using solid phase microextraction (HS-SPME-GC-MS) by standard addition.

50 mg ground samples are weighed into 20 mL headspace vials and after the addition of limonene in different concentrations and a glass-coated magnetic stir bar, the vial is closed with a magnetic cap lined with silicone/PTFE. Micro capillaries (10 pL) are used to add diluted limonene standards of known concentrations to the sample. Addition of 0, 2, 20 and 100 ng equals 0 mg/kg, 0.1 mg/kg, 1 mg/kg and 5 mg/kg limonene, in addition standard amounts of 6.6 mg/kg, 11 mg/kg and 16.5 mg/kg limonene is used in combination with some of the samples tested in this application. For quantification, ion-93 acquired in SIM mode is used. Enrichment of the volatile fraction is carried out by headspace solid phase microextraction with a 2 cm stable flex 50/30 pm DVB/Carboxen/PDMS fibre at 60° C. for 20 minutes. Desorption is carried out directly in the heated injection port of a GCMS system at 270° C.

GCMS Parameters:
Column: 30 m HP 5 MS 0.25*0.25
Injector: Splitless with 0.75 mm SPME Liner, 270° C.
Temperature program: −10° C. (1 min)
Carrier gas: Helium 5.0, 31 cm/s linear velocity, constant flow
MS: Single quadrupole, direct interface, 280° C. interface temperature
Acquisition: SIM scan mode
Scan parameter: 20-300 amu
SIM Parameter: m/Z 93, 100 ms dwell time m) Fatty Acid Detection Fatty acid quantification is carried out using headspace solid phase micro-extraction (HS-SPME-GC-MS) by standard addition.

50 mg ground samples are weighed in 20 mL headspace vial and after the addition of limonene in different concentrations and a glass coated magnetic stir bar the vial is closed with a magnetic cap lined with silicone/PTFE. 10 µL Microcapillaries are used to add diluted free fatty acid mix (acetic acid, propionic acid, butyric acid, pentanoic acid, hexanoic acid and octanoic acid) standards of known concentrations to the sample at three different levels. Addition of 0, 50, 100 and 500 ng equals 0 mg/kg, 1 mg/kg, 2 mg/kg and 10 mg/kg of each individual acid. For quantification ion 60 acquired in SIM mode is used for all acids except propanoic acid, here ion 74 is used.

GCMS Parameter:
Column: 20 m ZB Wax plus 0.25*0.25
Injector: Split 5:1 with glass lined split liner, 250° C.
Temperature program: 40° C. (1 min) @6° C./min to 120° C., @15° C. to 245° C. (5 min)
Carrier: Helium 5.0, 40 cm/s linear velocity, constant flow
MS: Single quadrupole, direct interface, 220° C. inter face temperature
Acquisition: SIM scan mode
Scan parameter: 46-250 amu 6.6 scans/s
SIM Parameter: m/z 60, 74, 6.6 scans/s n) Presence of Polyamide-6 and Polystyrene By FTIR spectroscopy using the absorption of the band at 1601 cm$^{-1}$ (PS) and 3300 cm$^{-1}$(PA6).

o) Determination of Contaminations on the Plaques

The plaques are injection-moulded, 150×80×2 mm dimension. Then, a high-resolution image (photograph) is taken on the 5 plaques (putting them close to each other). The image is then analyzed by a software allowing an automatic counting of the number of visual defects (by naked-eyes) due to contaminations.

p) Dynamic Shear Measurements (Eta(2.7 kPa) and Eta (300rad/s))

The characterisation of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression-moulded plates, using nitrogen atmosphere and setting a strain within the linear viscoelastic regime. The oscillatory shear tests were done at 230° C. applying a frequency range between 0.01 and 600 rad/s and setting a gap of 1.3 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t)=\gamma_0 \sin(\omega t) \quad (1)$$

If the applied strain is within the linear viscoelastic regime, the resulting sinusoidal stress response can be given by $$\sigma(t)=\sigma_0 \sin(\omega t+\delta) \quad (2)$$

where $\sigma_0$ and $\gamma_0$ are the stress and strain amplitudes, respectively
$\omega$ frequency is the angular
$\delta$ is the phase shift (loss angle between applied strain and stress response)
t is the time Dynamic test results are typically expressed by means of several different rheological functions, namely the shear storage modulus G', the shear loss modulus, G", the complex shear modulus, G*, the complex shear viscosity, $\eta^*$, the dynamic shear viscosity, $\eta'$, the out-of-phase component of the complex shear viscosity $\eta''$ and the loss tangent, tan $\delta$ which can be expressed as follows:

$$G' = \frac{\sigma_0}{\gamma_0}\cos\delta \, [Pa] \quad (3)$$

$$G' = \frac{\sigma_0}{\gamma_0}\sin\delta \, [Pa] \quad (4)$$

$$G^* = G' + iG'' \, [Pa] \quad (5)$$

$$\eta^* = \eta' - i\eta'' \, [Pa \cdot s] \quad (6)$$

$$\eta' = \frac{G''}{\omega} \, [Pa \cdot s] \quad (7)$$

$$\eta'' = \frac{G'}{\omega} \, [Pa \cdot s] \quad (8)$$

ETA(x kPa) is determined according with equation 9.

$$ETA(x\,kPa)=Eta^*\text{for}(G^*=x\,kPa)[Pa \cdot s] \quad (9)$$

For example, the ETA(2.7 kPa) is the defined by the value of the complex viscosity, determined for a value of complex modulus equal to 2.7 kPa.

Eta (x rad/s) is determined according with equation 10.

$$ETA(x\,\text{rad/s})=Eta^*\text{for}(\omega=x\,\text{rad/s})[Pa \cdot s] \quad (10)$$

For example, the ETA(300 rad/s) is defined by the value of the complex viscosity, determined at a frequency sweep of 300 rad/s.

q) Shear Thinning Factor (STF) is Defined as $$STF = \frac{Eta^* \text{ for } (\omega = 0.05 \text{ rad/s})}{Eta^* \text{ for } (\omega = 300 \text{ rad/s})} \quad (11)$$

The values are determined by means of a single point interpolation procedure, as defined by Rheoplus software. In situations for which a given G* value is not experimentally reached, the value is determined by means of an extrapolation, using the same procedure as before. In both cases (interpolation or extrapolation), the option from Rheoplus "-Interpolate y-values to x-values from paramete and the "logarithmic interpolation type" were applied.

REFERENCES

[1] Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol, 11th (1992), 1, 360-362

[2] The influence of molecular structure on some rheological properties of polyethylene", Heino, E. L., *Borealis* Polymers Oy, Porvoo, Finland, Annual Transactions of the Nordic Rheology Society, 1995).

[3] Definition of terms relating to the non-ultimate mechanical properties of polymers, Pure & Appl. Chem., Vol. 70, No. 3, pp. 701-754, 1998.

r) Large Amplitude Oscillatory Shear (Laos)

The investigation of the non-linear viscoelastic behavior under shear flow was done resorting to Large Amplitude Oscillatory Shear. The method requires the application of a sinusoidal strain amplitude, $\gamma 0$, imposed at a given angular frequency, $\omega$, for a given time, t. Provided that the applied sinusoidal strain is high enough, a non-linear response is generated. The stress, a is in this case a function of the applied strain amplitude, time and the angular frequency. Under these conditions, the non-linear stress response is still a periodic function; however, it can no longer be expressed by a single harmonic sinusoid. The stress resulting from a non-linear viscoelastic response [0-0] can be expressed by a Fourier series, which includes the higher harmonics contributions:

$$\sigma(t,\omega,\gamma_0)=\gamma_0 \cdot \Sigma_n[G'_n(\omega,\gamma_0), \sin(n\omega t)+G''_n(\omega,\gamma_0), \cos(n\omega t)] \quad (1)$$

with, $\sigma$—stress response
t—time
$\omega$—frequency
$\gamma_0$—strain amplitude
n—harmonic number
$G'_n$—n order elastic Fourier coefficient
$G''_n$—n order viscous Fourier coefficient The non-linear viscoelastic response was analysed applying Large Amplitude Oscillatory Shear (LAOS). Time sweep measurements were undertaken on an RPA 2000 rheometer from Alpha Technologies coupled with a standard biconical die. During the course of the measurement the test chamber is sealed and a pressure of about 6 MPa is applied. The LAOS test is done applying a temperature of 190° C., an angular frequency of 0.628 rad/s and a strain of 1000%.

In order to ensure that steady state conditions are reached, the non-linear response is only determined after at least 20 cycles per measurement are completed. The Large Amplitude Oscillatory Shear Non-Linear Factor (LAOS_NLF) is defined by:

$$LAOS_{NLF}(190° C., 1000\%) = \left|\frac{G'_1}{G'_3}\right| \quad (2)$$

where $G'_1$—first order Fourier Coefficient
$G'_3$—third order Fourier Coefficient

[1] J. M. Dealy, K. F. Wissbrun, *Melt Rheology and Its Role in Plastics Processing: Theory and Applications*; edited by Van Nostrand Reinhold, New York (1990)
[2] S. Filipe, Non-Linear Rheology of Polymer Melts, AIP Conference Proceedings 1152, pp. 168-174 (2009)
[3] M. Wilhelm, *Macromol. Mat. Eng.* 287, 83-105 (2002)
[4] S. Filipe, K. Hofstadler, K. Klimke, A. T. Tran, Non-Linear Rheological Parameters for Characterisation of Molecular Structural Properties in Polyolefins, Proceedings of Annual European Rheology Conference, 135 (2010)
[5] S. Filipe, K. Klimke, A. T. Tran, J. Reussner, Proceedings of Novel Non-Linear Rheological Parameters for Molecular Structural Characterisation of Polyolefins, Novel Trends in Rheology IV, Zin, Check Republik (2011)
[6] K. Klimke, S. Filipe, A. T. Tran, Non-linear rheological parameters for characterization of molecular structural properties in polyolefins, Proceedings of European Polymer Conference, Granada, Spain (2011)

s) Cross Fractionation Chromatography

The chemical composition distribution as well as the determination of the molecular weight distribution and the corresponded molecular weight averages (Mn, Mw and Mv) at a certain elution temperature (polymer crystallinity in solution) were determined by a full automated Cross Fractionation Chromatography (CFC) as described by Ortin A., Monrabal B., Sancho-Tello J., Macromol. Symp., 2007, 257, 13-28.

A CFC instrument (PolymerChar, Valencia, Spain) was used to perform the cross-fractionation chromatography (TREF×SEC). A four band IR5 infrared detector (Polymer-Char, Valencia, Spain) was used to monitor the concentration. The polymer was dissolved at 160° C. for 150 minutes at a concentration of around 1 mg/ml.

To avoid injecting possible gels and polymers, which do not dissolve in TCB at 160° C., like PET and PA, the weighed out sample was packed into stainless steel mesh MW 0.077/D 0.05 mmm.

Once the sample was completely dissolved an aliquot of 0.5 ml was loaded into the TREF column and stabilized for a while at 110° C. The polymer was crystallized and precipitate to a temperature of 30° C. by applying a constant cooling rate of 0.1° C./min. A discontinuous elution process is performed using the following temperature steps: (35, 40, 50, 55, 60, 65, 70, 75, 80, 85, 90, 95, 100, 103, 106, 109, 112, 115, 117, 119, 121, 123, 125, 127, 130, 135 and 140).

In the second dimension, the GPC analysis, 3 PL Olexis columns and 1× Olexis Guard columns from Agilent (Church Stretton, UK) were used as stationary phase. As eluent 1,2,4-trichlorobenzene (TCB, stabilized with 250 mg/L 2,6-Di tert butyl-4-methyl-phenol) at 150° C. and a constant flow rate of 1 mL/min were applied. The column set was calibrated using universal calibration (according to ISO 16014-2:2003) with at least 15 narrow MWD polystyrene (PS) standards in the range of 0.5 kg/mol to 11 500 kg/mol. Following Mark Houwink constants were used to convert PS molecular weights into the PP molecular weight equivalents.

$K_{PS}=19\times10^{-3}$ mL/g, $\alpha_{PS}=0.655$ $K_{PP}=19\times10^{-3}$ mL/g, $\alpha_{PP}=0.725$ A third order polynomial fit was used to fit the calibration data. Data processing was performed using the software provided from PolymerChar with the CFC instrument.

Calculation of the Relative Fraction at Certain Molecular Weight and Elution Temperature Areas of Iso-PP in Wt.-%.

To calculate the relative fraction at certain molecular weight and elution temperature areas of iso-PP in wt.-% in the first step the amount of iso-PP in wt.-% from the CFC contour plot needs to be calculated:

Iso PPin wt.-%=100−EPRfraction−PEfraction equation (1)

Where the EPR is the fraction with a molar mass higher than log M of 3.5 of the soluble fraction (SF) in TCB at 35° C. obtained by CFC analysis $$EPR \text{ fraction in wt.-\%} = \frac{\sum_{j=3.5}^{8} H_j}{\sum_{j=2}^{8} H_j} * SF \quad \text{equation (2)}$$

Due to the slightly dependence of the TREF profile on the low MW part, the molecular weight limit of the low MW limit is elution temperature ($T_{el}$) dependent. The low MW limit was determined using the following formula:

Low MW limit(for PE Fraction)=$0.0185*T_{el}+3.1538$

Taking this into account the PE fraction is calculated using the following approach.

$$PE_{Fraction} = \frac{\sum_{i=35}^{99} \sum_{j=0.0185*i+3.1538}^{8} H_{ij}}{\sum_{i=30}^{140} \sum_{j=2}^{8} H_{ij}} * 100 \quad \text{(equation 3)}$$

Where $H_{ij}$ is the 2D differential distribution at the corresponded elution temperature (Tel) i and the log M value j, obtained with the corresponded data processing software.

The High crystalline PE fraction (HCF-PE) is defined as the part of the PE fraction eluting from 90° C. to 100° C. of PE fraction.

$$HCF-PE = \frac{\sum_{i=90}^{99} \sum_{j=0.0185*i+3.1538}^{8} H_{ij}}{\sum_{i=30}^{140} \sum_{j=2}^{8} H_{ij}} * 100 \quad \text{(equation 4)}$$

This fraction contains mainly homo PE and PE copolymers with very low amount of comonomer, below app. 3 SCB/1000TC (L. Wild, T. R. Ryle, D. C. Knoblauch, I. R. Peat, J. Polym. Sci, Polym. Phys. 20, (1982), 441-455).

Where the low crystalline PE Fraction (LCF-PE) is defined as the part of the PE fraction eluting between 35° C. and 89° C. of the PE fraction.

$$HCF-PE = \frac{\sum_{i=35}^{89} \sum_{j=0.0185*i+3.1538}^{8} H_{ij}}{\sum_{i=30}^{140} \sum_{j=2}^{8} H_{ij}} * 100 \quad \text{(equation 5)}$$

This fraction contains mainly the copolymer fraction from HDPE and LLDPE obtained by ZN catalysts or the LLDPE from SS catalysts but also LDPE, as this kind of polymer are co-eluting due to their comparable amount of SCB/1000TC.

BASIC REFERENCES

Zhang, Macromol Symp. 282 (2009), 111-127.
W. Yau, D. Gillespie, Polymer 42 (2001) 8947-8958.
Monrabal, in "'Encyclopedia of Analytical Chemistry", R. A. Meyers, Ed., John Wiley & Sons Ltd., 2000.
Nakano, Y. Goto, J. Appl. Polym. Sci. (1981), 26, 4217.
W. Yau, Macromol. Symp. 2007, 257, 29-45.
Faldi, J. B. P. Soares, Polymer 42 (2001) 3057-3066.
Ortin, B. Monrabal, J, Sancho-Tello, Macromol. Symp. 257 (2007), 13-28.
Li Pi Shan, D. Gillespie, L. Hazlitt, Ecorep 2005. Lyon.

EXAMPLES

A post-consumer plastic trash was coarsely sorted as to polymer nature and as to color. In a further step, white and colorless parts were selected. The selected parts were subjected to milling, washing in an aqueous solution with various detergents and subsequent drying and screening. The pretreated post-consumer plastic material was further sorted thereby reducing colored parts. In a further quality control step the intermediate was subjected to Cross Fractionation Chromatography (automated instrument combining TREF and CPC; available from Polymer Char; details cf. above). All intermediates having a low crystalline PE Fraction (LCF-PE) outside the range of 2.8 to 4.2 wt.-% were discarded and subjected back to the incoming post-consumer trash. After extrusion into pellets, the pellets were subjected to aeration (aeration only done with IE3; aeration conditions: at 120° C. air, pre-heating substrate).

For examples IE4 the same process was followed. However, after coarsely sorting as to polymer nature and as to color, the post-consumer plastic trash was screened as to apparently very old ('ancient') mainly colorless/natural plastic articles recognizable by discoloration (e.g. pronounced yellowing) and/or pronounced scratches of the mainly colorless/natural plastic articles. Such very old ('ancient') mainly colorless/natural plastic articles were sorted out, whereby a strict standard was followed, i.e. in case of doubt, the article in question was sorted out. This was done for excluding incorporation of polybrominated diphenyl ethers which have been banned in many countries for more than about 10 years. Intermediates were also screened as to substances of very high concern. Partial warping turned out to be not necessary.

All examples were subjected to CRYSTEX QC analysis.

TABLE 1

Characteristics of the inventive examples

|  | IE1 | IE2 | IE3 | IE4 | CE3 virgin random heterophasic polypropylene copolymer (RAHECO) | CE4 virgin random visbroken | claimed features |
|---|---|---|---|---|---|---|---|
| target |  | $1^{st}$ embodiment (CIELAB color) L* from 85.0 to 97.0; a* from −5.0 to 0.0; b* from 0.0 to below 8.0 + CRYSTEX QC analysis 87.0 to 90.0 wt.-% crystalline fraction (CF) content and 10.0 to 13.0 wt.-%, soluble fraction (SF) content |  | $2^{nd}$ embodiment (CIELAB color) L* from 72.0 to 97.0, preferably from 80.0 to 97.0; a* from −5.0 to 0.0; b* from 0.0 to below 22.0 + CRYSTEX QC analysis 91.0 to 94.0 wt.-% crystalline fraction (CF) content and 6.0 to 9.0 wt.-%, soluble fraction (SF) content |  |  |  |
| CF wt.-% | 88.9 | 89.4 | 89.2 | 92.6 | 84.9 | 91.2 | 86.0 to 94.0 |
| SF wt.-% | 11.1 | 10.6 | 10.8 | 7.4 | 15.1 | 8.8 | 6.0 to 14.0 |
| C3 (CF) wt.-% | 97.2 | 96.9 | 96.9 | 97.2 | 96.5 | 97.3 | 95.0 to 99.0 pref. 96.0 to 98.0 |
| C2 (CF) wt.-% | 2.8 | 3.1 | 3.1 | 2.8 | 3.5 | 2.7 | 1.0 to 5.0 pref. 2.0 to 4.0 more pref. 2.5 to 3.5 |
| IV(SF) dl/g | 1.41 | 1.39 | 1.36 | 1.27 | 2.40 | 0.72 | 1.10 to below 1.50 pref. 1.25 to 1.45 |

TABLE 1-continued

Characteristics of the inventive examples

| | IE1 | IE2 | IE3 | IE4 | CE3 virgin random heterophasic polypropylene copolymer (RAHECO) | CE4 virgin random visbroken | claimed features |
|---|---|---|---|---|---|---|---|
| Inorganic residues (TGA), wt. % DIN ISO 1172 | 2.0 | 2.0 | 2.0 | 0.06 | <0.05 | <0.05 | 0.05 to 3.0 pref. 0.05 to 2.5 optionally. 1.0 to 2.5 |
| Benzene presence (HS GC-MS 80° C./2 h) | <LOD (Limit of Detection) | <LOD (Limit of Detection) | <LOD (Limit of Detection) | <LOD (Limit of Detection) | <LOD (Limit of Detection) | <LOD (Limit of Detection) | <LOD (Limit of Detection) |
| Color | | | | | | | |
| L* | 92.0 | 92.5 | 92.5 | 83 | 84 | | 80.0 to 97.0 |
| a* | −1.4 | −1.5 | −1.5 | 0.3 | −0.8 | | −5.0 to 0.0 |
| b* | 6.4 | 6.4 | 6.4 | 20 | −2.0 | | 0.0 to below 22.0 |
| MFR(230° C./2.16 kg), g/10 min | 19 | 51 | 51 | 7.4 | 7 | 8 | 2.0 to 100 (claim 2) |
| Density, kg/m³ ISO-1183 | 919 | 919 | 919 | 909 | n.d. | n.d. | – |
| Recycled material | yes | yes | yes | Yes | no, virgin | no, virgin | claim 3 |
| mixture of countless polypropylenes | yes | yes | yes | yes | no | no | < > |
| Polystyrene | not detectable | not detectable | not detectable | not detectable | no | no | claim 4 |
| Polyamide-6 | not detectable | not detectable | not detectable | not detectable | no | no | claim 4 |
| Limonene (HS-SPME-GC-MS) | >1 ppm | >1 ppm | >1 ppm | n.d. | no | no | claim 4 |
| Fatty acids (HS-SPME-GC-MS) | n.d. | n.d. | n.d. | n.d. | no | no | claim 4 |
| C2(SF) | 28.3 | 27.1 | 27.0 | 17.7 | 36.3 | 20.4 | 15.0 to 32.0 pref. 15.0 to 20.0 (claim 5) |
| Odor grade VDA270-B3 | 4 | n.d. | 3 | 3 | n.m. | n.m. | 4 or lower (claim 6) pref. 3 or lower (claim 6) |
| low crystalline PE Fraction (LCF-PE) in CFC (wt.-%) | 3.1 | n.m. | 3.7 | 3.9 | n.m. | n.m. | |
| LAOS - NLF 1000% 190° C. | 2.76 | 3.67 | 3.50 | 2.4 | 2.0 | 3.0 | >2.3 (claim 1) pref. >2.7 pref. >3.3 (claim 7) |
| Tensile Modulus, MPa | 1444 | 1390 | 1397 | 1267 | 1224 | 709 | at least 1200 pref. 1250/1300/1350/1390 (claim 8) |
| Melting point; ° C. | | | | 160 | 164 | 140 | |
| Charpy NIS + 23° C., kJ/m² (>96 h) | 4.9 ± 0.6 | 4.7 ± 0.6 | 4.6 ± 0.2 | 8.5 ± 0.4 | 7.1 ± 0.1 | 7.6 ± 0.1 | – |
| eta (2.7 kPa) | 1271 | 481 | 354 | 2910 | 3108 | 2377 | |
| stability of eta (2.7 kPa) | 1306 ++ | 483 ++ | 379 + | | n.m. | n.m. | |
| eta (0.05 rad/s) Pa · s. | 1833 | | 451 | 4080 | 4246 | 2759 | |
| eta (300 rad/s), Pa · s. | 199 | 141 | 123 | 275 | 306 | 316 | |
| stability of eta (300 rad/s), Pa · s. | 203 ++ | 142 ++ | 129 ++ | | n.m. | n.m. | |
| Shear thinning factor STF eta 0.05/eta 300 | 9.0 | n.d. | 3.7 | 14.8 | 13.9 | 8.7 | |

TABLE 1-continued

Characteristics of the inventive examples

| | IE1 | IE2 | IE3 | IE4 | CE3 virgin random heterophasic polypropylene copolymer (RAHECO) | CE4 virgin random visbroken | claimed features |
|---|---|---|---|---|---|---|---|
| VOC (VDA278) pellets, μg/g | n.m. | n.m. | 6 | 6 | 159 | 98 | |
| FOG (VDA278) pellets, μg/g | n.m. | n.m. | 244 | 253 | 169 | 112 | |
| VDA277 (total carbon emission) pellet, 5 h/120° C. | 10 | n.m. | n.m. | 3 | n.m. | 33 | |

It can be seen that the prior art is enriched by the inventive recycling composition. The inventive recycling composition showed only minor drawbacks as to impact when compared with virgin compositions and virgin visbroken compositions. Moreover, the processability as reflected by high LAOS-NLF was really good for IE2 and IE3. The VOC (VDA) was surprisingly good for IE3 and IE4.

Comparative Example CE3 was a virgin random heterophasic polypropylene copolymer. Accordingly the tensile modulus was relatively high for the total amount of ethylene (reflected by C2(CF) and C2(SF) and the amounts of CF and SF). However, this is not a recyclate, processability as reflected by LAOS—NLF is relatively poor at a Charpy NIS of 7.1 kJ/m$^2$.

Comparative Example CE4 was a virgin random copolymer, which was subjected to visbreaking (for adaptation of the melt flow rate to about the same value as IE4). CE4 was significantly less stiff compared to CE3 and had a Charpy NIS of 7.6 kJ/m$^2$. Inventive example IE4 had a marginally higher stiffness than CE3 and simultaneously the best overall Charpy NIS of 8.5 kJ/m$^2$. Inventive Examples IE1 to 3 all had significantly higher stiffness and simultaneously only moderate Charpy NIS drawbacks.

The examples were subjected to evaluation of surface defects at injection molded test articles. The best commercial grades (CE1 and CE2) as available on the market were compared. Results are shown in FIG. 1.

CE1: is PP off-white product from Van Werven having a density of 920 kg/m$^3$ and MFR(230° C./2.16 kg) of 24 g/10 min.

CE2: Morssinkhof-Rymoplast supplies regrinds and regranulates, with the name MOPRYLENE®, having a density of 921 kg/m$^3$ and MFR (230° C./2.16 kg) of 27 g/10 min.

FIG. 1 shows the results of the defect evaluation. It can be seen that the inventive mixed-plastics polypropylene blends resulted in the lowest number of defects and also an even distribution thereof.

CE3 is a random heterophasic copolymer without slip and antiblock additives. It has a random copolymer PP matrix and a C3C2 rubber.

CE3 was produced in a Borstar polypropylene plant with a prepolymerization reactor, one slurry loop reactor, a first gas phase reactor and a second gas phase reactor configuration. The loop and first gas phase reactor were used to produce the matrix and second gas phase reactor for rubber phase.

The chemical composition of the reactants in each reactor were adjusted to reach the desired polymer design.

CE4 is a random copolymer, which was produced in a Borstar polypropylene plant with a prepolymerization reactor, one slurry loop reactor and one gas phase reactor configuration.

| | unit | CE3 | CE4 |
|---|---|---|---|
| | | Prepolymerizer | |
| Catalyst | | as decribed below | as decribed below |
| Teal | g/tC3 | 150 | 170 |
| Donor | g/tC3 | 40 | 40 |
| Donor type | n.a. | D | D |
| Temperature | ° C. | 20 | 30 |
| Residence time | h | 0.33 | 0.35 |
| | | Loop | |
| Temperature | ° C. | 80 | 70 |
| Feeding H2/C3 | mol/kmol | 0 | 0.6 |
| Feeding C2/C3 | mol/kmol | 3.3 | 7.5 |
| Split | wt % | 51 | 41 |
| MFR | g/10 min | 12 | 1.8 |
| C2 | wt % | 0 | 3.5 |
| XCS | wt % | 3 | 5.2 |
| | | First gas phase reactor | |
| Temperature | ° C. | 80 | 80 |
| H2/C3 | mol/kmol | 12 | 5.8 |
| C2/C3 | mol/kmol | 0 | 27 |
| Split | wt % | 34 | 59 |
| MFR | g/10 min | 12 | 1.9 |
| C2 | wt % | 0 | 4.1 |
| MFR$_2$ | g/10 min | 12 | 1.9 |
| | | Second gas phase reactor | |
| Temperature | ° C. | 70 | |
| H2/C2 | mol/kmol | 200 | |
| C2/C3 | mol/kmol | 50 | |
| Split | wt % | 15 | |

After polymerization the melt flow rate of the random copolymer CE4 was modified by vis-breaking during a compounding step in a twin screw extruder at 200-230° C. and using an appropriate amount of Luperox 101 (2,5-dimethyl-2,5-di(tert-butylperoxy)hexane) to achieve the target MFR2 of 8.0 g/10 min.

During said compounding step the following additives 1000 ppm Irganox B215 (a 1:2-mixture of Pentaerythrityl-tetrakis(3-(3',5'-di-tert. butyl-4-hydroxyphenyl)-propionate, CAS-no. 6683-19-8, and Tris (2,4-di-t-butylphenyl) phosphite, CAS-no. 31570-04-4, commercially available from BASF SE, Germany) and 150 ppm magnesium oxide (CAS-no. 1309-48-4) as acid scavenger were added during the compounding step.

The catalyst used in the polymerization process for the CE3 and CE4 was prepared as follows:

Used Chemicals:
20% solution in toluene of butyl ethyl magnesium (Mg(Bu)(Et), BEM), provided by Chemtura
2-ethylhexanol, provided by Amphochem
3-Butoxy-2-propanol-(DOWANOL™ PnB), provided by Dow
bis(2-ethylhexyl)citraconate, provided by SynphaBase
TiCl4, provided by Millenium Chemicals
Toluene, provided by Aspokem
Viscoplex® 1-254, provided by Evonik
Heptane, provided by Chevron Preparation of a Mg Alkoxy Compound Mg alkoxide solution was prepared by adding, with stirring (70 rpm), into 11 kg of a 20 wt-% solution in toluene of butyl ethyl magnesium (Mg(Bu)(Et)), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature 2.3 kg of the donor bis(2-ethylhexyl)citraconate was added to the Mg-alkoxide solution keeping temperature below 25° C. Mixing was continued for 15 minutes under stirring (70 rpm).

Preparation of Solid Catalyst Component 20.3 kg of TiCl4 and 1.1 kg of toluene were added into a 20 l stainless steel reactor. Under 350 rpm mixing and keeping the temperature at 0° C., 14.5 kg of the prepared Mg alkoxy compound was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped, the catalyst droplets were solidified and the formed catalyst particles were allowed to settle. After settling (1 hour), the supernatant liquid was siphoned away. Then the catalyst particles were washed with 45 kg of toluene at 90° C. for 20 minutes followed by two heptane washes (30 kg, 15 min). During the first heptane wash the temperature was decreased to 50° C. and during the second wash to room temperature.

Alternatively for the polymerization of the random copolymer (comparative CE3, CE4) a phthalate-free Ziegler Natta catalyst prepared as described in the example section of WO 2020/064673 A1 as "Reference Catalyst" is used.

The thus obtained catalyst was used along with triethyl-aluminium (TEAL) as co-catalyst and dicyclopentyl dimethoxy silane (D-Donor) as donor.

IE4 was further evaluated as to substances of very high concern (SVHC). Results are shown in the Table 2 below.

TABLE 2

| Evaluation substances of very high concern for IE4: | | | |
|---|---|---|---|
| Test item | Reporting Limit (RL), mg/kg | RoHS limit, mg/kg | IE4 mg/kg |
| Cd | 1 | 100 | <1 |
| Pb | 10 | 1000 | <10 |
| Hg | 0.5 | 1000 | <0.5 |
| Cr (VI) | 1 | 1000 | <1 |
| Polybrominated diphenyl ethers (PBDE) | | sum 1000 | not detected |
| Polybrominated biphenyls (PBB) | | sum 1000 | not detected |
| Bis(2-ethylhexyl)phthalate (DEHP) | 100 | 1000 | not detected |
| Benzyl Butyl phthalate (BBP) | 100 | 1000 | not detected |
| Dibutyl phthalate (DBP) | 100 | 1000 | not detected |
| Diisobutyl phthalate DiBP | 100 | 1000 | not detected |
| Polycyclic aromatic hydrocarbons PAH | | Sum of 18 < 10 | 0.2 |
| Short chain chlorinated paraffins (SCCP) | | <1500 | <50 |
| Phtalates | | <0.1% in article | <100 |
| Chlorinated Phenols | | <5 | <0.1 |
| Other flame retardants | | X | <100 |
| Cl | | 50 | <50 |
| Br | | 50 | <50 |
| F | | 50 | <50 |
| I | | 50 | <50 |
| SCORE | | | Pass |
| SVHC | | | <0.1% |
| Total SCORE (for RoHS and SVHC) | | | pass |

RoHS—Restriction of Hazardous Substances in Electrical and Electronic Equipment
RL—Reporting Limit (test data will be shown if it is ≥RL. RL is not regulatory limit)

Method for SVHCs (according to REACH regulation 1907/2006/EU)

The whole analysis was done at SGS.

In-house method at SGS are CTS-HL-114-1, CTS-HL-234-5 analysed by ICP-OES, UV-VIS, GC-MS, HPLC-DAD/MS and colorimetric method Determination of Cadmium by ICP-OES, acc. to IEC 62321-5:2013-6

Determination of Lead by ICP-OES, acc. to IEC 62321-5:2013-6

Determination of Mercury by CV-AAS, acc. to IEC 62321-4:2013-6

Determination of Chromium by ICP-OES, acc. to IEC 62321-5:2013-6

Determination of Chromium(VI) acc. to IEC 62321->Non-metallic samples:

Determination by ion chromatography, acc. to IEC 62321-7-2:2017-03;

Remark: The concentration of Cr(VI) in a corrosion-protection can change depending on storage time and conditions.

Determination of PBB/PBDE (flame retardants) by GC/MS, acc. to IEC 62321-6:2015-6

Remark: Acc. to IEC, the testing for PBB/PBDE is only intended for polymers.

Softeners DEHP, DBP; BBP, DIBP and an extended list according to REACH (IEC 62321-8:2017, GC-MS Determination of Phthalates by GC/MS after extraction with THF, acc. to IEC 62321-8:2017-3; Method not under accreditation Remark: Acc. to IEC, the testing for phthalates is only intended for polymers.

CE3 is a bimodal virgin random polypropylene which was evaluated for comparative purposes. It can be seen that virgin random polypropylenes can be substituted by the inventive blends with surprising benefits as to impact.

As a further application example, injection molded pails were produced with standard process setting. The surface quality turned out to be as good as the surface quality of comparable virgin material. Thickness distribution and mechanical properties were also excellent.

The invention claimed is:

1. A mixed-plastics polypropylene blend having:
   (i) a crystalline fraction (CF) content determined according to CRYSTEX QC analysis in the range from 86.0 to 94.0 wt.-%, and
   (ii) a soluble fraction (SF) content determined according to CRYSTEX QC analysis in the range from 6.0 to 14.0 wt.-%, wherein
   (iii) the crystalline fraction (CF) has a propylene content (C3(CF)) as determined by FT-IR spectroscopy calibrated by quantitative $^{13}$C-NMR spectroscopy, in the range from 95.0 to 99.0 wt.-%; and wherein
   (iv) the crystalline fraction (CF) has an ethylene content (C2(CF)), as determined by FT-IR spectroscopy calibrated by quantitative $^{13}$C-NMR spectroscopy, in the range from 1.0 to 5.0 wt.-%; and
   (v) the soluble fraction (SF) has an intrinsic viscosity (iV(SF)) in the range from 1.10 to below 1.50 dl/g; and wherein
   (vi) the mixed-plastics polypropylene blend has inorganic residues as measured by calcination analysis (TGA) according to DIN ISO 1172:1996 of 0.05 to 3.0 wt.-%, with respect to the mixed-plastics polypropylene blend; and wherein
   (vii) the mixed-plastics polypropylene blend does not contain benzene above the detection limit of HS GC-MS 80° C./2 h; and wherein
   (viii) the mixed-plastics polypropylene blend has a CIELAB color space (L*a*b*) of
      L* from 72.0 to 97.0;
      a* from −5.0 to 0.0;
      b* from 0.0 to below 22.0; and
   the mixed-plastics polypropylene blend has a Large Amplitude Oscillatory Shear Non-Linear Factor [LAOS-NLF] (190° C., 1000%) higher than 2.3, wherein $$LAOS-NLF = \left|\frac{G'_1}{G'_3}\right|$$

whereby
      $G_1'$ is the first order Fourier Coefficient
      $G_3'$ is the third order Fourier Coefficient,
   wherein the mixed plastics polypropylene blend is a recycled material.

2. The mixed-plastics polypropylene blend according to claim 1 having a melt flow rate (ISO1133, 2.16 kg; 230° C.) of 2.0 to 100 g/10 min.

3. The mixed-plastics polypropylene blend according to claim 1 containing one or more of the following substances:
   a) polystyrene
   b) polyamide-6
   c) limonene as determined by using solid phase micro-extraction (HS-SPME-GC-MS)
   d) fatty acids as determined by using solid phase micro-extraction (HS-SPME-GC-MS).

4. The mixed-plastics polypropylene blend according to claim 1 wherein the soluble fraction (SF) obtained by CRYSTEX QC analysis has an ethylene content (C2(SF)), as determined by FT-IR spectroscopy calibrated by quantitative $^{13}$C-NMR spectroscopy, in the range from 12.0 to 32.0 wt.-%.

5. The mixed-plastics polypropylene blend according to claim 1 having an odor (VDA270-B3) of 4 or lower.

6. The mixed-plastics polypropylene blend according to claim 1 having a Large Amplitude Oscillatory Shear-Non-Linear Factor [LAOS-NLF] (190° C., 1000%) higher than 2.7, wherein $$LAOS-NLF = \left|\frac{G'_1}{G'_3}\right|$$

wherein
      $G_1'$ the first order Fourier Coefficient
      $G_3'$ is the third order Fourier Coefficient.

7. The mixed-plastics polypropylene blend according to claim 1 having a tensile modulus (ISO 527-2 at a cross head speed of 1 mm/min; 23° C.) using injection molded specimens as described in EN ISO 1873-2 (dog bone shape, 4 mm thickness) of at least 1200 MPa.

8. The mixed-plastics polypropylene blend according to claim 1 having a notched Charpy impact strength (NIS) (1eA) (non-instrumented, ISO 179-1 at +23° C.) according to ISO 179-1 eA at +23° C. on injection moulded specimens of 80×10×4 mm prepared according to EN ISO 1873-2 of at least 8.0 kJ/m², wherein further the soluble fraction (SF) obtained by CRYSTEX QC analysis has an ethylene content (C2(SF)), as determined by FT-IR spectroscopy calibrated by quantitative $^{13}$C-NMR spectroscopy, in the range from 12.0 to 20.0 wt.-% and further the mixed-plastics polypropylene blend has a CIELAB color space (L*a*b) of
   L* from 72.0 to 97.0;
   a* from −5.0 to 0.0;
   b* from 0.0 to below 22.0
   and further a crystalline fraction (CF) content determined according to CRYSTEX QC analysis in the range from 91.0 to 94.0 wt.-% and a soluble fraction (SF) content determined according to CRYSTEX QC analysis of 6.0 to 9.0 wt.-%.

9. The mixed-plastics polypropylene blend according to claim 1 being in the form of pellets.

10. The mixed-plastics polypropylene blend according to claim 1 being visbroken by peroxides.

11. A molded article made from the mixed-plastics polypropylene blend according to claim 1.

12. A blend containing the mixed-plastics polypropylene blend according to claim 1 and at least one virgin polyolefin.

13. A blend containing the mixed-plastics polypropylene blend according to claim 1 and at least one virgin polyolefin being a heterophasic polypropylene.

* * * * *